No. 773,942. PATENTED NOV. 1, 1904.
M. J. KELLY.
SLIP PREVENTING DEVICE FOR RUBBER TIRED WHEELS.
APPLICATION FILED OCT. 26, 1903. RENEWED OCT. 6, 1904.
NO MODEL.
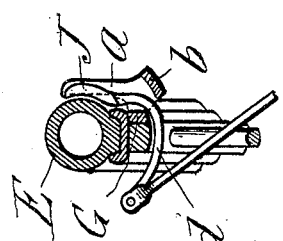
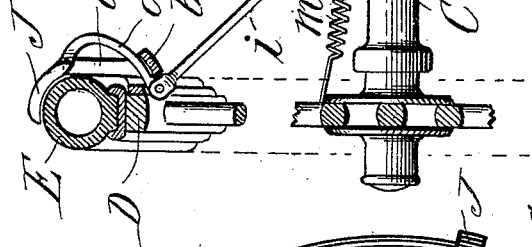
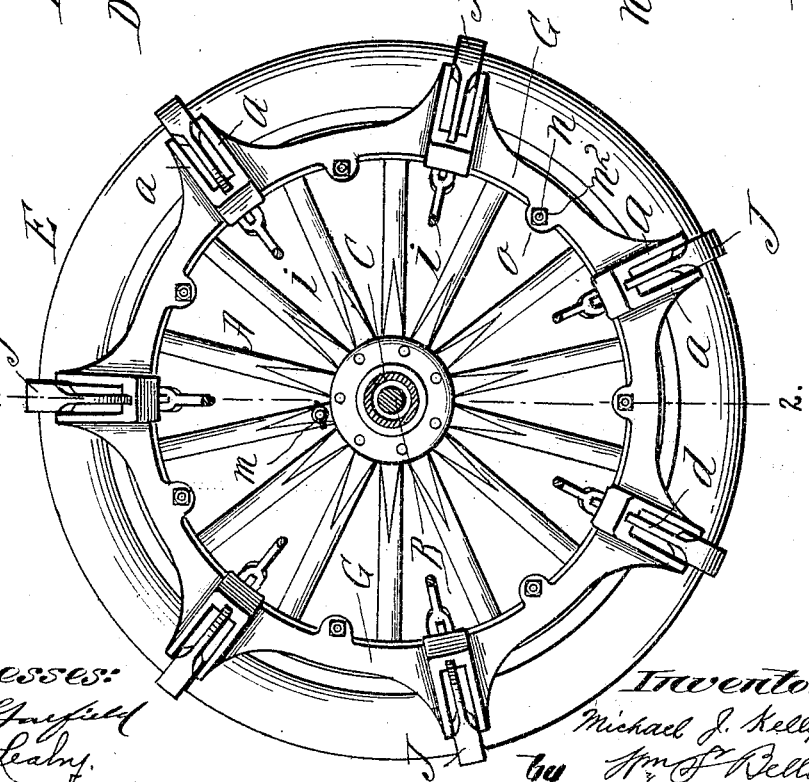

No. 773,942. Patented November 1, 1904.

UNITED STATES PATENT OFFICE.

MICHAEL J. KELLY, OF SPRINGFIELD, MASSACHUSETTS.

SLIP-PREVENTING DEVICE FOR RUBBER-TIRED WHEELS.

SPECIFICATION forming part of Letters Patent No. 773,942, dated November 1, 1904.

Application filed October 26, 1903. Renewed October 6, 1904. Serial No. 227,364. (No model.)

*To all whom it may concern:*

Be it known that I, MICHAEL J. KELLY, a citizen of the United States of America, and a resident of Springfield, in the county of Hampden and State of Massachusetts, have invented certain new and useful Improvements in Slip-Preventing Devices for Rubber-Tired Wheels, of which the following is a full, clear, and exact description.

This invention relates to improvements in wheels for vehicles, and more particularly rubber-tired wheels for automobiles.

The object of the invention is to equip one of the wheels, preferably one of the rear wheels, for the automobile with a plurality of shoes which have normally a disposition withdrawn from but in proximity to the tread-surface of the wheel-tire and which have a capability of movement more or less across and upon the tread of the tire, together with guiding means for the shoes and means for operating the shoes so that under favorable conditions the wheel may be run for tractional action as an ordinary wheel and the same as if it had no shoe equipment and yet when there is occasion therefor, as by the presence of snow or ice on the roads, the shoes may have their projections across the wheel-tread for preventing slipping of the wheel and insuring efficient tractional effect thereon.

The invention embodies, in combination with the wheel, a plurality of shoes arranged adjacent the rim of the wheel and adapted to have normally dispositions withdrawn from across the wheel-tread and to be susceptible of projection across the tread and have means operative in conjunction therewith for effecting the positioning of the shoes as desired.

In the drawings a wheel which may be considered as an exemplification of the present invention is illustrated, Figure 1 being an elevation as seen at the inside of the wheel, showing the shoe-guides and shoes and portions of the connections which are operative to place the shoes in the positions thereof desired. Fig. 2 is a sectional view as taken substantially on the plane of the axis of the wheel and as represented by line 2 2, Fig. 1, the part of the axle-sleeve being shown, as well also as the reciprocatory shoe-controlling sleeve, which is rotatable in unison with the wheel. Fig. 2 shows one of the shoes as projected across the wheel-tread. Fig. 3 is a view showing parts in section on the same plane as Fig. 2, the shoe-guides here being represented as in their normal or withdrawn positions. Fig. 4 is a perspective view of a rim portion of the wheel, showing one of the shoe-guides and a part of the shoe-operating connection.

Similar characters of reference indicate corresponding parts in all of the views.

In the drawings, A represents the wheel, for which B is the axle, and C represents the axle-sleeve, the latter, as very common in automobiles, being fixed and non-rotatable and connected as a stationary part of the running-gear frame. The wheel is shown as constructed with a rim D, having a pneumatic or other resilient tire E, and on the inner face of the rim is secured or clamped an annular flat metallic plate G, having pairs of separated ear-lugs $a$ $a$, which constitute the opposite boundaries of transverse guiding-apertures for the curved shoes J, the lateral edges of which movably fit and are guided by and between the said pairs of ears. At the bases of the said ears $a$ and located inwardly from the face of the annular plate G are members $b$, which unite the ears and constitute by their inclosed faces, which are toward the wheel-tire, guides for the inwardly-projecting curved shoe extensions $d$.

L represents a sleeve arranged for sliding movement about the axle or axle-sleeve C and in the line of the wheel-axis, the same being freely rotatable in unison with the wheel and has an annular groove $f$, in which engages a collar embraced by a yoke-arm $g$ of an annular lever, the other arm, $g^2$, of which has connected thereto a rod $g^3$, which may be extended to any convenient place to be hand-operated—as, for instance, at or near the seat of the vehicle. The said sleeve L has a plurality of ear-lugs $h$ inwardly and radially arranged, pivotally secured to which are connecting-rods $i$ $i$, which are also at their outer ends pivotally connected to the inner extremities of the shoe extensions $d$. By imparting a motion in the proper direction to the rod $g^3$ the sleeve L will be slid to the right to assume the position of Fig. 2, the connecting-rods $i$ drawing the shoe extensions transversely of the plane of rotation of the wheel, and the guides cause the extensions and shoes to assume the position shown, in which the shoes are across the tread of the wheel, and of course the reversed motion of the operating connections brings about a withdrawal of the shoes to the position shown in Fig. 3.

It is understood that the sleeve L will remain in any position in which it may be set, and the spring $m$, connected in tension to the sleeve L and to one of the spokes of the wheel, is merely provided for the purpose of preventing the sleeve from rattling.

The annular plate G may be practicably secured on the side of the wheel-rim by the employment of lug-ended bolts $n$ and nuts $n^2$ therefor, the lugs engaging one side of the rim or felly and the screw-threaded shanks penetrating the inwardly-extended ears $o$ of the plate G. Of course the plate instead of being in one continuous annular part may be segmental or sectionally formed, all as might be considered most convenient or practicable.

One of the rear wheels of an automobile or both thereof may be equipped with devices substantially as herein described.

Having thus described my invention, what I claim, and desire to secure by Letters Patent, is—

1. A rubber-tired wheel having adjacent its tread portion one or more shoes, mounted for revoluble movement thereon in unison with the wheel-rim, and also arranged for independent movements of projection across the tread and withdrawal therefrom, means for guiding and constraining the shoes in such movements, and means for imparting such movements of the shoes thereto.

2. A wheel having at its rim a series of transversely-apertured guides and a plurality of shoes movably engaged in and through said guides and having inward extensions, a sleeve arranged to encircle the axle for the wheel and freely rotatable in unison with the wheel, a series of connecting-rods, pivoted to said sleeve and respectively to said inward extensions, and means for imparting back-and-forth movements to said sleeve in the line of the wheel-axis.

3. A wheel having secured at the inner side of its rim a metallic plate constructed with a plurality of transversely-apertured shoe-guides, the openings in which are adjacent the tread portion of the wheel, combined with a series of curved shoes slidably engaged in said shoe-guiding apertures and provided with inwardly-projecting curved extensions, a sleeve, arranged to encircle the wheel-axle, and freely rotatable in unison with the wheel, a plurality of rods pivoted to the sleeve and respectively connected with the shoe extensions.

4. A wheel having at the side of its rim an annular metallic plate constructed with a plurality of transverse shoe-guiding apertures, the boundaries of which are constituted by transversely-extending separated lugs or ears, means for confining said annular plate on the side of the wheel-rim, a plurality of shoes of curved form, edgewise movably fitted between the boundary-lugs of said apertures and provided with inward extensions, combined with a sleeve rotatable in unison with the wheel and encircling the wheel-axle, a plurality of rods pivoted to the sleeve and to the shoe extensions, and means for moving the sleeve backward and forward along the line of the wheel-axis.

5. A wheel having at the side of its rim an annular metallic plate constructed with a plurality of transverse shoe-guiding apertures, the boundaries of which are constituted by transversely-extending separated lugs or ears $a a$, which have the uniting portions $b$ inwardly offset from the face of said plate, means for confining said annular plate on the side of the wheel-rim, a plurality of shoes of curved form and edgewise movably fitted between the boundary-lugs of said apertures and provided with inward extensions adapted for engagements with said portions $b$, combined with a sleeve rotatable in unison with the wheel and encircling the wheel-axle, a plurality of rods pivoted to the sleeve and to the shoe extensions, and means for moving the sleeve backward and forward along the line of the wheel-axis.

6. A wheel having at its rim a series of transversely-apertured guides and a plurality of shoes movably engaged in and through said guides and having inward extensions, a grooved sleeve arranged to encircle the axle for the wheel and freely rotatable in unison with the wheel, a series of connecting-rods, pivoted to said sleeve and respectively to said inward extensions, and a lever engaging the grooved sleeve, and an operating-rod for said lever.

7. A wheel having secured at the inner side of its rim a metallic plate constructed with a plurality of transversely-apertured shoe-guides, the openings in which are adjacent the tread portion of the wheel, combined with a series of curved shoes slidably engaged in said shoe-guiding apertures and provided with inwardly-projecting curved extensions, a sleeve arranged to encircle the wheel-axle and freely rotatable in unison with the wheel, a plurality of rods pivoted to the sleeve and respectively to the shoe extensions, and a spring connected under tension to the sleeve and to the wheel, for the purpose set forth.

Signed by me at Springfield, Massachusetts, in presence of two subscribing witnesses.

MICHAEL J. KELLY.

Witnesses:
  A. V. LEAHY,
  WM. S. BELLOWS.